United States Patent
Jeon et al.

(10) Patent No.: US 11,780,314 B2
(45) Date of Patent: Oct. 10, 2023

(54) HYBRID VEHICLE HAVING IMPROVED ARRANGEMENT STRUCTURE

(71) Applicants: Hyundai Motor Company, Seoul (KR); Kia Motors Corporation, Seoul (KR)

(72) Inventors: Hyun Do Jeon, Seoul (KR); Tac Koon Kim, Seoul (KR); Bu Yeol Ryu, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 282 days.

(21) Appl. No.: 16/927,426

(22) Filed: Jul. 13, 2020

(65) Prior Publication Data

US 2021/0023930 A1 Jan. 28, 2021

(30) Foreign Application Priority Data

Jul. 23, 2019 (KR) .................. 10-2019-0088656

(51) Int. Cl.
*B60K 6/28* (2007.10)
*B60K 1/04* (2019.01)
*B62D 21/11* (2006.01)
*B60K 15/07* (2006.01)

(52) U.S. Cl.
CPC .............. *B60K 6/28* (2013.01); *B60K 1/04* (2013.01); *B60K 15/07* (2013.01); *B62D 21/11* (2013.01); *B60K 2001/0433* (2013.01); *B60Y 2200/92* (2013.01)

(58) Field of Classification Search
CPC ... B60K 6/28; B60K 1/00; B60K 1/04; B60K 2001/0433; B60K 2015/0633; B60K 15/07; B60K 15/063; B60K 15/03; B60K 15/067; B60Y 2200/92; B62D 21/11; B62D 21/15; B62D 21/00; B62D 21/02; B62D 25/20; B62D 25/2027
See application file for complete search history.

(56) References Cited

U.S. PATENT DOCUMENTS 6,736,229 B1 * 5/2004 Amori ................ B60R 16/04
180/68.5
7,004,274 B2 2/2006 Shibasawa et al.
7,051,825 B2 * 5/2006 Masui ................ B60L 50/16
280/783

(Continued)

FOREIGN PATENT DOCUMENTS

CN 103029757 A 4/2013
EP 2172356 A1 4/2010

(Continued)

*Primary Examiner* — James M Dolak
(74) *Attorney, Agent, or Firm* — Fox Rothschild LLP (57) ABSTRACT

A hybrid vehicle having an improved arrangement structure is provided. The hybrid vehicle includes a fuel tank which provides fuel to an engine, and is disposed in a first area which is recessed upward from the under surface of the exterior of a vehicle body. A battery provides an electric driving force to a vehicle, and is disposed in a second area which is recessed downward between the bottom of the interior of the vehicle body and a rear seat. The first area is disposed further forward than the second area in a longitudinal direction of the vehicle body.

7 Claims, 4 Drawing Sheets

(56) References Cited

U.S. PATENT DOCUMENTS

| | | | | |
|---|---|---|---|---|
| 7,240,752 | B2* | 7/2007 | Takahashi | B60R 16/04 |
| | | | | 454/143 |
| 7,614,473 | B2* | 11/2009 | Ono | B60L 1/003 |
| | | | | 180/291 |
| 7,654,351 | B2* | 2/2010 | Koike | B60L 3/0007 |
| | | | | 180/68.5 |
| 7,743,863 | B2* | 6/2010 | Shindou | H01M 50/202 |
| | | | | 180/68.5 |
| 7,913,788 | B1 | 3/2011 | Bryer et al. | |
| 8,393,426 | B2 | 3/2013 | Takahashi et al. | |
| 8,403,096 | B2* | 3/2013 | Taguchi | B60K 6/46 |
| | | | | 180/56 |
| 8,556,016 | B2 | 10/2013 | Yoda et al. | |
| 8,631,886 | B2* | 1/2014 | Kawamura | B60L 58/12 |
| | | | | 903/905 |
| 8,794,365 | B2 | 8/2014 | Matsuzawa et al. | |
| 8,881,853 | B2* | 11/2014 | Nitawaki | B60L 50/66 |
| | | | | 180/68.5 |
| 8,887,695 | B2* | 11/2014 | Aso | F02M 25/0854 |
| | | | | 180/68.5 |
| 8,978,617 | B2 | 3/2015 | Matsuda | |
| 9,045,163 | B2* | 6/2015 | Theodore | B60K 6/50 |
| 9,308,805 | B2 | 4/2016 | Shiromura et al. | |
| 9,944,173 | B2* | 4/2018 | Ajisaka | B60K 1/04 |
| 9,963,031 | B2 | 5/2018 | Saeki | |
| 10,259,309 | B2* | 4/2019 | Ajisaka | B60K 6/46 |
| 10,427,518 | B2* | 10/2019 | Komiya | B60K 15/067 |
| 10,787,203 | B2* | 9/2020 | Montgomery | B60K 6/28 |
| 11,225,898 | B2* | 1/2022 | Sugiyama | F01N 3/0857 |
| 11,465,482 | B2* | 10/2022 | Menon | B60L 50/66 |
| 11,465,692 | B2* | 10/2022 | Schlesinger | B62D 27/04 |
| 11,476,536 | B2* | 10/2022 | Takeda | H01M 10/625 |
| 11,491,867 | B2* | 11/2022 | Cragel | C09D 5/08 |
| 11,541,738 | B2* | 1/2023 | Menon | B60L 50/66 |
| 11,548,553 | B2* | 1/2023 | Ajisaka | B62D 21/157 |
| 2011/0168468 | A1* | 7/2011 | Taguchi | B60L 15/20 |
| | | | | 180/65.245 |
| 2017/0368929 | A1* | 12/2017 | Ryu | B60K 15/067 |

FOREIGN PATENT DOCUMENTS

| | | |
|---|---|---|
| EP | 2447099 A1 | 5/2012 |
| KR | 2009-0006911 A | 1/2009 |

* cited by examiner

FIG. 1

RELATED ART

HYBRID VEHICLE HAVING IMPROVED ARRANGEMENT STRUCTURE

CROSS-REFERENCE TO RELATED APPLICATION

This application claims under 35 U.S.C. § 119(a) the benefit of priority to Korean Patent Application No. 10-2019-0088656 filed on Jul. 23, 2019, the entire contents of which are incorporated herein by reference.

BACKGROUND

(a) Technical Field

The present disclosure relates to a hybrid vehicle having an improved arrangement structure, and more particularly, to a hybrid vehicle having an improved arrangement structure, which mounts a fuel tank on the undersurface of the exterior of a vehicle body, mounts a battery between the bottom of the interior of the vehicle body and the rear seat thereof, and disposes the fuel tank further forward than the battery.

(b) Background Art

Generally, hybrid vehicles such as a plug in hybrid electric vehicle (PHEV) and a hybrid electric vehicle (HEV) refer to a vehicle which are driven by a gasoline engine and an electric motor separately mounted therein, and when vehicle travels by using the gasoline engine in an inefficient traveling environment, it is possible to enhance efficiency of the entire system by charging the electric motor.

Since a hybrid vehicle travels using only the electric motor after stopping the engine in a situation where the engine power is unnecessary, it is possible to reduce harmful emissions as well as reducing noise and improving fuel efficiency of the vehicle. In recent years, the demand for the hybrid vehicle capable of reducing the harmful emissions is increasing according to the demand such as emission regulations and increasing the fuel efficiency.

The hybrid vehicle includes an engine mounted together with an electric motor as a driving source of the vehicle, and a fuel tank is provided to store liquid fuel for driving the engine and a high-voltage battery which supplies electric energy for driving the electric motor together. Since the high-voltage battery is a high-voltage electric component in which explosion and failure may occur by water or impact, it is essential that the high-voltage battery be mounted in the interior of the vehicle.

Conventionally, the high-voltage battery is mounted to a separate interior space at the rear of the vehicle, that is, in the lower side of a trunk compartment, which makes it difficult to secure sufficient trunk space. In other words, when the high-voltage battery is mounted to the lower side of the trunk compartment at the rear of the vehicle, the capacity of the trunk area is inevitably reduced, thereby lowering the merchantability of the trunk space in the vehicle, deteriorating the vehicle weight distribution, and the like.

As described above, by mounting the high-voltage battery at the bottom of the trunk compartment results in reduction of the trunk space which is utilized for various purposes, thus rendering it more difficult to store a spare tire or the like therein. Further, there is no structural countermeasure for the vehicle body structure and the battery mounting structure for securing the space, securing the stiffness of the battery mounting part, strengthening collision performance, and the like, the arrangement structure of the battery and the fuel tank, and the like when the high-voltage battery of a substantial weight is intended to be mounted in another interior space other than the trunk compartment to secure the capacity of the trunk area in the narrow vehicle space.

Figure 1:
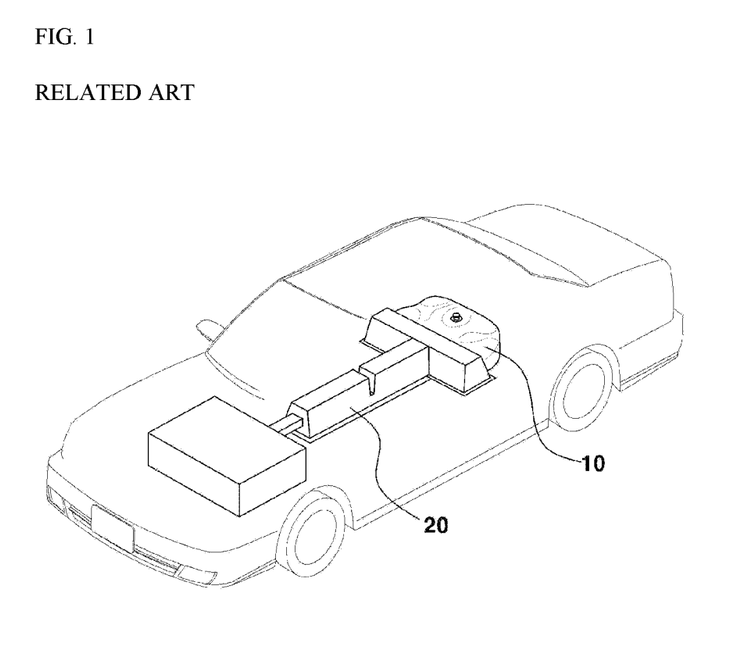
FIG. 1 is a perspective diagram of a vehicle including a fuel tank and a battery, as the related art.

FIG. 1 is a perspective diagram of a vehicle including a fuel tank and a battery, as the related art. As illustrated, a T-shaped battery 20 is included in the center of the vehicle, and a fuel tank 10 is disposed behind the battery 20. In particular, the central floor of the vehicle rises and the space occupied by the battery 20 is large, thereby narrowing the interior space.

The above information disclosed in this section is merely for enhancement of understanding of the background of the disclosure and accordingly it may contain information that does not form the related art that is already known in this country to a person of ordinary skill in the art.

SUMMARY

The present disclosure provides a hybrid vehicle having an improved arrangement structure, which changes the mounting location of a high-voltage battery from the existing location of a trunk compartment to the lower portion of the rear seat in a hybrid vehicle.

Further, the present disclosure provides a hybrid vehicle having an improved arrangement structure, which disposes a fuel tank and a battery together in a space under the rear seat, and disposes the fuel tank of the exterior of the vehicle body further forward than the battery of the interior of the vehicle body. Still further, the present disclosure provides a hybrid vehicle having an improved arrangement structure, which applies a rear suspension to a battery.

The objects of the present disclosure are not limited to the above-mentioned objects, and other objects of the present disclosure, which are not mentioned above, may be understood by the following description and more clearly understood by the exemplary embodiments of the present disclosure. Further, the objects of the present disclosure may be realized by the means and combinations thereof recited in the claims.

A hybrid vehicle having an improved arrangement structure for achieving the objects of the present disclosure includes the following configuration. An exemplary embodiment of the present disclosure provides, in the hybrid vehicle, the hybrid vehicle having an improved arrangement structure including a fuel tank which provides fuel to an engine, and may be disposed in a first area which is recessed upward from the under surface of the exterior of a vehicle body, and a battery which provides an electric driving force to a vehicle, and may be disposed in a second area which is under the rear seat and recessed downward from the bottom of the interior of the vehicle body, and the first area may be disposed further forward than the second area in the longitudinal direction of the vehicle body.

Further, an exemplary embodiment of the present disclosure provides the hybrid vehicle having the improved arrangement structure that may further include a first lateral member fastened to one end of the front of the rear seat in the longitudinal direction of the vehicle body and one end of the fuel tank, and disposed in the first area, and a second lateral member fastened to one end of the rear of the rear seat in the longitudinal direction of the vehicle body and one end of the rear of the battery in the longitudinal direction of the vehicle body, and disposed in the second area.

The vehicle may further include a third lateral member fastened to one end of the rear of the fuel tank and one end of the front of the battery, and disposed in the second area adjacent to the first area. A pair of longitudinal members may be formed along the longitudinal direction of the vehicle body, and at least one of a first lateral member, a second lateral member, and a third lateral member may be fastened to the pair of longitudinal members.

Additionally, the height of the lower surface of the second area may be lower than the height of the upper surface of the first area. The vehicle may further include a fuel tank band which surrounds at least a portion of the fuel tank to fix the fuel tank to the vehicle body. A rear suspension which may be formed along the lateral direction of the vehicle body, and may be disposed between a second lateral member and the battery or between a third lateral member and the battery.

The present disclosure may obtain the following effects by the aforementioned exemplary embodiments and the configuration, combination, and use relationship to be described later.

In the hybrid vehicle according to the present disclosure, by changing the mounting location of the high-voltage battery from the existing location of the trunk compartment to the lower portion of the rear seat, it may be possible to increase the capacity of the trunk compartment, and to improve the merchantability of the trunk space, the vehicle weight distribution problem, and the like. Further, in the present disclosure, by disposing the fuel tank further forward than the battery in a space under the rear seat, it may be possible to secure the efficient space when the battery is intended to be mounted in another interior space other than the trunk compartment. Additionally, by applying the rear suspension, it may be possible to secure excellent vehicle collision performance.

The effects of the present disclosure are not limited to the above-described effects. It should be understood that the effects of the present disclosure include all inferable effects in the following description.

BRIEF DESCRIPTION OF THE DRAWINGS

The above and other features of the present disclosure will now be described in detail with reference to exemplary embodiments thereof illustrated in the accompanying drawings which are given herein below by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in more detail with reference to the accompanying drawings. The exemplary embodiments of the present disclosure may be modified in various forms, and the scope of the present disclosure should not be construed as being limited to the following exemplary embodiments. This exemplary embodiment is provided to more completely explain the present disclosure to those skilled in the art.

Further, terms such as " . . . unit" described in the specification means a unit for processing at least one function or operation, which may be implemented as a combination of hardware. In this specification, the names of the components are divided into first, second, and the like in order to distinguish them because the names of the components are the same and are not necessarily limited to the order in the following description. Additionally, in the present specification, when the longitudinal direction is a front and rear direction, which a longitudinal direction of the vehicle body, the lateral direction means a left and right direction, which is a width direction of the vehicle body.

Figure 2:
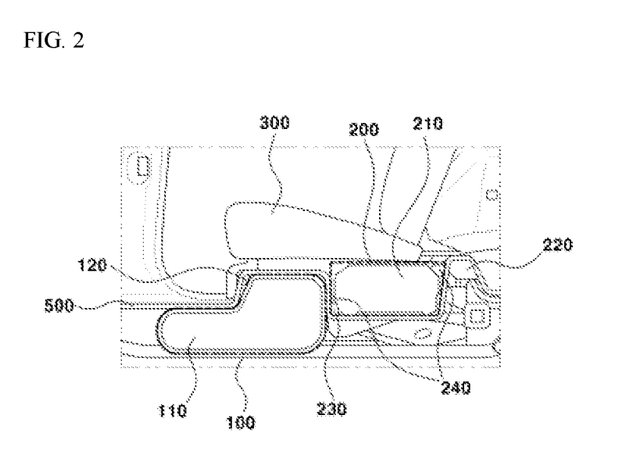
FIG. 2 is a side cross-sectional diagram of a main part of a hybrid vehicle having an improved arrangement structure, as an exemplary embodiment of the present disclosure.

The present disclosure relates to a hybrid vehicle having an improved arrangement structure, and FIG. 2 is a side cross-sectional diagram of a main part of a hybrid vehicle having an improved arrangement structure, as an exemplary embodiment of the present disclosure. Referring to FIG. 2, a hybrid vehicle having an improved arrangement structure according to an exemplary embodiment of the present disclosure may include a fuel tank 110 which provides fuel to an engine, and may be disposed in a first area 100 which is recessed upward from the under surface of the exterior of a vehicle body, and a battery 210 which provides an electric driving force to a vehicle, and may be disposed in a second area 200 which is under the rear seat and recessed downward from the bottom of the interior of the vehicle body, and the first area 100 may be located further forward than the second area 200 in the longitudinal direction of the vehicle body.

Further, the height of the lower surface of the second area 200 may be lower than the height of the upper surface of the first area 100. Generally, a hybrid vehicle broadly refers to driving a vehicle by efficiently combining two or more different types of power sources, but mostly refers to a vehicle which obtains a driving force by the engine using fuel and the electric motor driven by the power of the battery, which is called a hybrid electric vehicle (HEV). An electric vehicle refers to all vehicles which use electricity as a power source, and may include a plug in hybrid electric vehicle (PHEV) which uses electricity as a portion of the power source. Hereinafter, the hybrid electric vehicle is referred to as a hybrid vehicle.

The first area 100 may be an area which is recessed upward from the under surface of the exterior of the vehicle. The upward recessed shape of the first area 100 may be formed to correspond to the shape of the fuel tank 110, and accordingly, when the fuel tank 110 is inserted from the bottom to the top, a separation space between a vehicle body bottom part 500 and the fuel tank 110 may be maximally reduced. The second area 200 may be an area which is recessed downward between the bottom of the interior of the vehicle body and the rear seat 300. The downward recessed shape of the second area 200 may be formed to correspond to the shape of the battery 210, and accordingly, when the battery 210 is inserted from the top to the bottom, a separation space between the vehicle body bottom part 500 and the battery 210 may be maximally reduced.

Further, the first area 100 may be disposed further forward than the second area 200 in the longitudinal direction of the vehicle body. When both the fuel tank 110 and the battery 210 are disposed under the rear seat 300, the fuel tank 110 and the battery 210 are required to be located in the interior of the vehicle body and the relatively heavy battery 210 may be disposed further backward than the fuel tank 110 in the longitudinal direction of the vehicle, and thus, the first area 100 and the second area 200 may be a structural countermeasure of the arrangement of the battery 210 and the fuel tank 110 for securing a space when the high-voltage battery 210 intends to be mounted in another interior space other than the trunk compartment.

The fuel tank 110 may store liquid fuel for driving the engine, and may provide fuel to the engine, and may be disposed in the first area 100 which is recessed upward from the under surface of the exterior of the vehicle body. The hybrid vehicle equipped with the engine may be mounted with a fuel pump configured to pump liquid fuel in the fuel tank 110 in which fuel is stored, and configured to inject the fuel pumped by the fuel pump into a combustion chamber of the engine through an injector.

The battery 210 may be mounted to the vehicle body to store electrical energy, and may provide an electric driving force to the vehicle, and may be disposed in the second area 200 which is recessed downward between the bottom of the interior of the vehicle body and the rear seat 300. The battery 210 may be disposed further backward than the fuel tank 110 with respect to the longitudinal direction of the vehicle.

The battery 210 may be directly charged through an external power source, and may also be charged by a power transform system such as a drive motor inverter, a low-voltage step-down direct current-direct current (DC-DC) converter, a boost DC-DC converter, or a built-in charger. Particularly, the battery 210 may be divided into one or more to be connected to one or more alternators, respectively. For example, if the battery 210 of 48V is required, it may be used by connecting four 12V batteries 210 in parallel, connecting four 12V alternators, respectively, or connecting two 24V alternators to the four batteries 210, respectively.

The battery 210 type may be a lead acid battery, a nickel-hydrogen (Ni-MH) battery, a Li-ion battery, a Ni—Cd battery, a Li-polymer battery, an air-Zn battery, a Na—S battery, and a Na—$NiCl_2$ battery, and the present disclosure is not particularly limited thereto. Additionally, the height of the lower surface of the second area 200 may be lower than the height of the upper surface of the first area 100.

The vehicle body bottom part 500 may have a curved cross-sectional shape which is recessed downward and thus, a portion of the vehicle body bottom part 500 of the second area 200 in which the battery 210 is installed may have a lower height than the portion of the vehicle body bottom part 500 of the first area 100 in which the fuel tank 110 is installed. Accordingly, the mounting space of the fuel tank 110 may be formed in front of the battery 210. Further, a third lateral member 230, which is installed lengthwise in the lateral direction of the vehicle body, may be installed on the upper surface of the front lower side of the curved portion of the vehicle body bottom part 500, and a second lateral member 220, which is installed lengthwise in the lateral direction of the vehicle, may be installed on the lower surface of the upper side of the curved portion thereof. The vehicle body bottom part 500 of the first area 100 in which the fuel tank 110 is installed may form the inclined surface which gradually increases upward from the front to the rear, and a first lateral member 120, which is disposed lengthwise in the lateral direction of the vehicle body, may be installed on the lower surface of the rear of the inclined surface.

An exemplary embodiment of the present disclosure may be a hybrid vehicle having two, three or more rows of seats. The hybrid vehicle having the improved arrangement structure according to an exemplary embodiment of the present disclosure may further include the first lateral member 120 fastened to one end of the front of the rear seat 300 in the longitudinal direction of the vehicle body and one end of the fuel tank 110, and disposed in the first area 100 and the second lateral member 220 fastened to one end of the rear of the rear seat 300 in the longitudinal direction of the vehicle body and one end of the rear of the battery 210 in the longitudinal direction of the vehicle body, and located in the second area 200.

Figure 3:
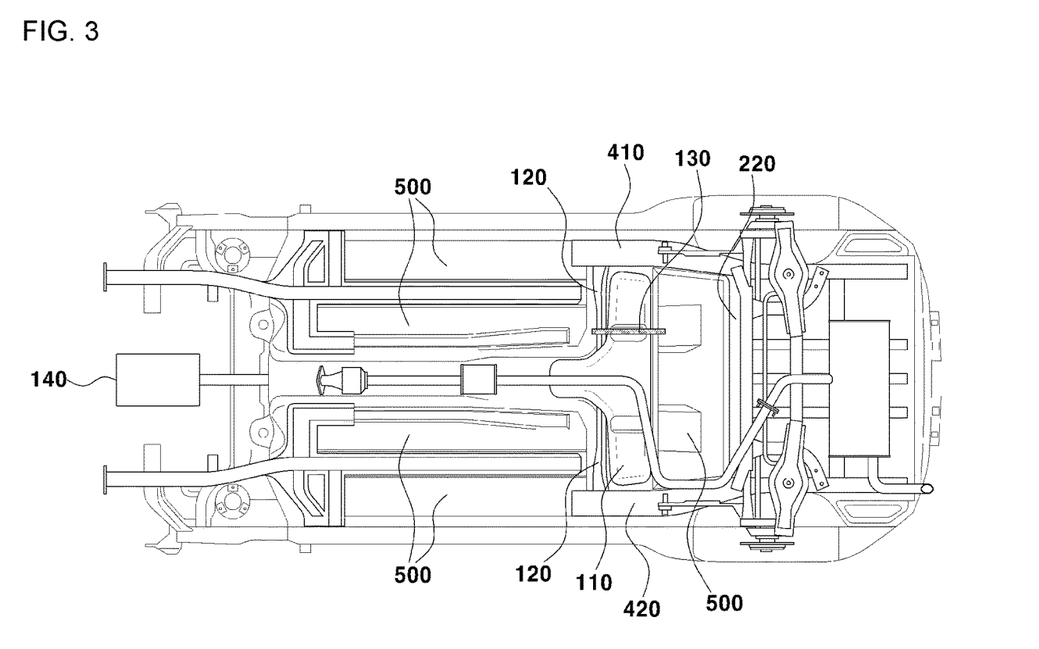
FIG. 3 is a rear diagram of the hybrid vehicle having the improved arrangement structure, as an exemplary embodiment of the present disclosure.

Further, the hybrid vehicle may further include the third lateral member 230 fastened to one end of the rear of the fuel tank 110 and one end of the front of the battery 210, and disposed in the second area 200 adjacent to the first area 100. The first lateral member 120 may be installed to be disposed lengthwise to the left and right in the lateral direction of the vehicle body, and as illustrated in FIG. 3, disposed at the lower side of the vehicle body bottom part 500, that is, in the first area 100, which is the exterior of the vehicle. Referring to FIG. 3, the fuel tank 110 may be disposed behind the first lateral member 120. One end of the fuel tank 110 may be fastened to the first lateral member 120. In other words, the fuel tank 110 may have one end fixed using a mounting bracket which is formed on the first lateral member 120 with being seated in the first area 100.

The rear seat 300 may also have the lower end of the front in the longitudinal direction of the vehicle body fastened to the first lateral member 120. Since the rear seat 300 may be disposed in the interior of the vehicle, the first lateral member 120 disposed in the exterior of the vehicle may be installed to penetrate the vehicle body bottom part 500, and fastened to a seat frame by the mounting bracket to fix the rear seat 300. The second lateral member 220 may be installed to be disposed lengthwise to the left and right in the lateral direction of the vehicle body, and as illustrated in FIG. 3, disposed at the lower side of the vehicle body bottom part 500, that is, in the second area 200, which is the exterior of the vehicle.

Referring to FIG. 2, the battery 210 may be disposed in front of the second lateral member 220. The upper end of the rear of the battery 210 may be fastened to the second lateral member 220. In other words, the battery 210 may have one end fixed using the mounting bracket which is formed on the second lateral member 220 with being seated in the second area 200. Since the battery 210 may be disposed in the interior of the vehicle, the second lateral member 220 disposed in the exterior of the vehicle may be installed to penetrate the vehicle body bottom part 500 to fix the battery 210 using the mounting bracket.

The rear seat 300 may also have the lower end of the rear fastened to the second lateral member 220. Since the rear seat 300 may be disposed in the interior of the vehicle, the second lateral member 220 disposed in the exterior of the vehicle may be installed to penetrate the vehicle body bottom part 500, and fastened to the rear seat 300 by the mounting bracket to fix the rear seat 300. Particularly, the rear seat 300 may include a seat cushion, a seat back, and a seat frame, and the seat frame may be fastened to the second lateral member 220. The third lateral member 230 may be installed to be disposed lengthwise to the left and right in the lateral direction of the vehicle body, and as illustrated in FIG. 2, disposed at the upper side of the vehicle body bottom part 500, that is, in the interior of the vehicle. Referring to FIG. 2, the third lateral member 230 may be disposed in the second area 200 adjacent to the first area 100.

One end of the rear of the fuel tank 110 may be fastened to the third lateral member 230. In other words, the fuel tank 110 may have one end fixed using the mounting bracket which is formed on the third lateral member 230 with being seated in the first area 100. Since the fuel tank 110 may be disposed in the exterior of the vehicle, the third lateral member 230 disposed in the interior of the vehicle may be installed to penetrate the vehicle body bottom part 500 to fix the fuel tank 110 using the mounting bracket. The battery 210 may also have the lower end of the front fastened to the third lateral member 230. In other words, the battery 210 may have one end fixed using the mounting bracket which is formed on the third lateral member 230 with being seated in the second area 200.

All of the first lateral member 120, the second lateral member 220, and the third lateral member 230 may be fixedly installed to the vehicle body bottom part 500 using a method such as welding or similar, and the first lateral member 120 and the second lateral member 220 may be fixedly installed to the lower surface of the vehicle body bottom part 500, and the third lateral member 230 may be fixedly installed to the upper surface of the vehicle body bottom part 500.

Further, the first lateral member 120, the second lateral member 220, and the third lateral member 230 may not be installed on the same height and the same surface, and at least some of the lateral members may also be installed on the same height as each other, or all of the lateral members may also be installed on different heights at each location according to the shape of the vehicle body bottom part 500.

FIG. 3 is a rear diagram of the hybrid vehicle having the improved arrangement structure according to an exemplary embodiment of the present disclosure. Referring to FIG. 3, the fuel tank 110 may be mounted forward in the longitudinal direction of the vehicle body and lengthwise in the lateral direction of the vehicle body. Further, the battery 210, which is mounted above the vehicle body bottom part 500 and not shown in FIG. 3, may also be mounted lengthwise in the lateral direction of the vehicle body behind the fuel tank 110. A hybrid vehicle having an improved arrangement structure according to another exemplary embodiment of the present disclosure may further include a fuel tank band 130 which surrounds at least a portion of the fuel tank 110 to fix the fuel tank 110 to the vehicle body.

As illustrated in FIG. 3, the fuel tank 110 may be supported by the vehicle body by the fuel tank band 130 together with the first lateral member 120 and the third lateral member 230. The fuel tank band 130 surrounds at least a portion of the outer circumferential surface of the fuel tank 110 and then may be fastened to the vehicle body to support the fuel tank 110, and may be formed of a steel plate having a predetermined thickness to increase stiffness. Accordingly, a rib may also be formed in the cross section of the fuel tank band 130. The fuel tank band 130 may also be provided in pairs and installed to be spaced apart from each other along the width direction of the fuel tank 110 to support the fuel tank 110, but may also be installed along the longitudinal direction of the fuel tank 110 to support the fuel tank 110.

Referring to FIG. 3, the hybrid vehicle having the improved arrangement structure according to an exemplary embodiment of the present disclosure may further include a pair of longitudinal members which are formed along the longitudinal direction of the vehicle body, and at least one of the first lateral member, the second lateral member, and the third lateral member may be fastened to the pair of longitudinal members. As illustrated in FIG. 3, a pair of longitudinal members 410, 420 may be disposed at both side ends with respect to the lateral direction of the vehicle body on the lower surface of the vehicle body bottom part 500, and formed lengthily in the longitudinal direction of the vehicle body to include the first area 100 and the second area 200.

The pair of longitudinal members 410, 420 may be fixedly installed on the lower surface of the vehicle body bottom part 500 using a method such as welding or the like. Particularly, the vehicle body frame may serve as a longitudinal member. At this time, the battery 210 may be fixed to the vehicle body only by being fastened to the second lateral member 220 and the third lateral member 230 as described above, but additionally, may also be fixed to the vehicle body by being fastened to the pair of longitudinal members 410, 420.

In summary, the fuel tank 110 may be fixed to the first lateral member 120 disposed on the exterior of the vehicle using the mounting bracket, and may also be fixed to the third lateral member 230 disposed in the interior of the vehicle and installed to penetrate the vehicle body bottom part 500 using the mounting bracket. Furthermore, the fuel tank band 130 may fix the fuel tank 110 to the vehicle body more firmly.

The battery 210 may be fixed to the third lateral member 230 disposed in the interior of the vehicle using the mounting bracket, and may also be fixed to the second lateral member 220 disposed on the exterior of the vehicle and installed to penetrate the vehicle body bottom part 500 using the mounting bracket. As a result, it may be possible to stably fix and sufficiently support the battery having the relatively large weight by fastening only two ends in the lateral direction of the battery. Further, it may be possible to minimize the member which increases the weight of the vehicle body.

Additionally, the battery 210 may also be additionally fastened and fixed to the pair of longitudinal members 410, 420 which are disposed on the exterior of the vehicle and installed to penetrate the vehicle body bottom part 500 using the mounting bracket. The rear seat 300 may be fixed to the first lateral member 120 disposed on the exterior of the vehicle and installed to penetrate the vehicle body bottom part 500 using the mounting bracket, and fixed to the second lateral member 220 disposed on the exterior of the vehicle and installed to penetrate the vehicle body bottom part 500 using the mounting bracket.

The hybrid vehicle having the improved arrangement structure according to an exemplary embodiment of the present disclosure may further include a rear suspension 240 formed along the lateral direction of the vehicle body, and disposed in at least one location of between the second lateral member 220 and the battery 210 and between the third lateral member 230 and the battery 210.

Generally, a suspension device of the vehicle is classified into a front suspension and a rear suspension as a device which prevents vibration or impact received from the road surface during vehicle operation from being transferred directly to the vehicle body, thereby preventing damage to the vehicle body or the cargo and providing comfortable ride. Physical properties of the rear suspension 240 may be formed of rigid bodies having all structures which provide an elastic force.

The battery 210 according to another exemplary embodiment of the present disclosure may also be directly fixed by the second lateral member 220 and the third lateral member 230, and installed and fixed to the second area with the rear suspension 240 interposed between the battery 210 and the second lateral member 220 or the rear suspension 240 interposed between the battery 210 and the third lateral member 230. If the rear suspension 240 is applied, the impact transferred to the battery 210 may be alleviated by absorbing the vibration of the vehicle body which is transferred to the second lateral member 220 or the third lateral member 230. As a result, it may be possible to secure improved vehicle collision performance.

Figure 4:
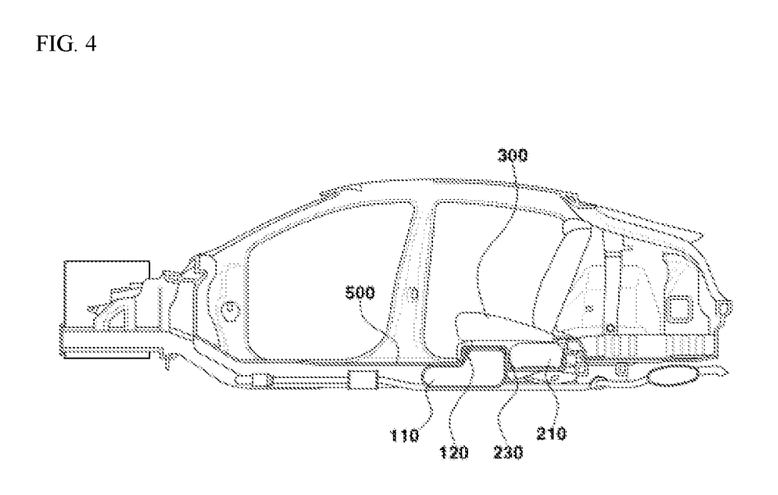
FIG. 4 is aside cross-sectional diagram of the hybrid vehicle having the improved arrangement structure, as an exemplary embodiment of the present disclosure.

FIG. 4 is a side cross-sectional diagram of the hybrid vehicle having the improved arrangement structure, as an exemplary embodiment of the present disclosure. When the high-voltage battery is mounted at the lower side of the trunk room, the capacity of the trunk compartment used for various purposes is reduced, and a spare tire or the like may not be able to be mounted due to the reduction in the capacity of the trunk compartment.

Referring to FIG. 4, the battery 210 according to an exemplary embodiment of the present disclosure may be installed at a position under the rear seat 300 which corresponds to the unused space in the hybrid vehicle, thereby maximally expanding the space of the trunk compartment compared to the conventional structure installed in the trunk compartment. As a result, it may be possible to improve the merchantability of the vehicle and to improve the convenience of the user. Further, by locating the fuel tank 110 connected to the engine part in the first area 100, it may be possible to simplify the coupling structure of the vehicle.

Furthermore, by forming the shape of the vehicle body bottom part 500 of the second area 200 to be recessed downward, it may be possible to prevent the rear seat from rising due to the structure of inserting the battery. The rear suspension 240 disposed between the second lateral member 220 and the battery 210 may absorb the front-rear directional vibration of the vehicle, and the rear suspension 240 disposed between the third lateral member 230 and the battery 210 may absorb the vertical vibration.

As described above, the present disclosure provides the hybrid vehicle having the improved arrangement structure, which may disposed the battery 110 further forward than the fuel tank 210 in the space under the rear seat 300, thereby increasing the capacity of the trunk compartment and securing an efficient space in the vehicle interior space.

The foregoing detailed description exemplifies the present disclosure. Further, the aforementioned contents illustrate and describe exemplary embodiments of the present disclosure, and the present disclosure may be used in various other combinations, changes, and environments. That is, changes or modifications may be made within the scope of the concept of the disclosure disclosed in the present specification, the scope equivalent to the disclosed contents, and/or the scope of the skill or knowledge in the art. The described exemplary embodiments describe the best mode for implementing the technical spirit of the present disclosure, and various changes, which are required in the specific application field and use of the present disclosure, are possible. Accordingly, the detailed description of the disclosure described above is not intended to limit the present disclosure to the disclosed exemplary embodiments. Further, the appended claims should also be construed to include other exemplary embodiments.

What is claimed is:

1. A hybrid vehicle having an improved arrangement structure, comprising:
    a fuel tank, which provides fuel to an engine, and is disposed in a first area which is recessed upward from a vehicle body bottom; and
    a battery, which provides an electric driving force to the hybrid vehicle, and is disposed in a second area which is under a rear seat and recessed downward from a bottom of an interior of the vehicle body;
    a fixed side member which is fastened to the vehicle body bottom part adjacent to one end of a rear of the fuel tank and to one end of a front of the battery, and is disposed in the second area adjacent to the first area;
    wherein the fixed side member is further fastened to one end of the rear of the fuel tank and one end of the front of the battery;
    wherein the first area is disposed further forward than the second area in a longitudinal direction of the vehicle body.

2. The hybrid vehicle claim 1, further comprising:
    a first lateral member which is fastened to the vehicle body bottom part adjacent to one end of a front of the rear seat in the longitudinal direction of the vehicle body and one end of the fuel tank, and disposed in the first area; and
    a second lateral member which is fastened to the vehicle body bottom part adjacent to one end of a rear of the rear seat in the longitudinal direction of the vehicle body, and disposed in the second area.

3. The hybrid vehicle of claim 1, further comprising:
    a pair of longitudinal members which are formed along the longitudinal direction of the vehicle body,
    wherein at least one of a first lateral member, a second lateral member, and the fixed side member is fastened to the pair of longitudinal members.

4. The hybrid vehicle of claim 1, wherein a height of a lower surface of the second area is lower than a height of an upper surface of the first area.

5. The hybrid vehicle of claim 1, further comprising:
a fuel tank band which surrounds at least a portion of the fuel tank to fix the fuel tank to the vehicle body bottom part.

6. The hybrid vehicle of claim 2, further comprising:
a rear suspension which is formed along a lateral direction of the vehicle body, and disposed in between the second lateral member and the battery.

7. A hybrid vehicle having an improved arrangement structure, comprising:
a fuel tank, which provides fuel to an engine, and is disposed in a first area which is recessed upward from an under surface of an exterior of a vehicle body;
a battery, which provides an electric driving force to the hybrid vehicle, and is disposed in a second area which is under a rear seat and recessed downward from a bottom of an interior of the vehicle body; and
a rear suspension which is formed along a lateral direction of the vehicle body, and disposed in between a fixed side member and the battery;
wherein the first area is disposed further forward than the second area in a longitudinal direction of the vehicle body; and
wherein the fixed side member is fastened to one end of the rear of the fuel tank and to one end of the front of the battery.

\* \* \* \* \*